United States Patent
Krilich

(10) Patent No.: US 7,513,774 B2
(45) Date of Patent: Apr. 7, 2009

(54) PRAYER STRAND MARKER DEVICE

(76) Inventor: Jon Krilich, 2633 New York Ave., Whiting, IN (US) 46394

( * ) Notice: Subject to any disclaimer, the term of this patent is extended or adjusted under 35 U.S.C. 154(b) by 441 days.

(21) Appl. No.: 11/451,103

(22) Filed: Jun. 12, 2006

(65) Prior Publication Data

US 2007/0298394 A1     Dec. 27, 2007

(51) Int. Cl.
*G09B 19/00* (2006.01)
(52) U.S. Cl. ..................................... 434/246
(58) Field of Classification Search ............... 434/246, 434/188, 203, 204; 63/3, 4, 1.11, 21, 23, 63/10; 368/224, 225
See application file for complete search history.

(56) References Cited

U.S. PATENT DOCUMENTS

| | | | | |
|---|---|---|---|---|
| 1,579,820 A | * | 4/1926 | Kislinger | 63/3 |
| 1,769,249 A | * | 7/1930 | Ahola | 223/99 |
| 2,677,901 A | * | 5/1954 | Tilleman | 434/246 |
| 2,730,816 A | * | 1/1956 | Garrett | 434/246 |
| 2,937,459 A | | 5/1960 | Belfield | 35/23 |
| 2,992,495 A | * | 7/1961 | Perreira | 434/246 |
| 3,325,915 A | * | 6/1967 | Duggan | 434/246 |
| 3,382,589 A | * | 5/1968 | Dowling | 434/246 |
| D415,976 S | * | 11/1999 | Be | D11/4 |
| 6,179,621 B1 | | 1/2001 | Vaccari | 434/246 |
| 6,561,415 B2 | * | 5/2003 | Grant | 235/61 R |
| 6,699,044 B1 | * | 3/2004 | Lang | 434/246 |
| 6,747,917 B2 | * | 6/2004 | Jennings et al. | 368/10 |
| 7,204,694 B2 | * | 4/2007 | Delvecchio et al. | 434/246 |
| 7,313,929 B2 | * | 1/2008 | Lazor | 63/3 |

* cited by examiner

*Primary Examiner*—Kurt Fernstrom
(74) *Attorney, Agent, or Firm*—Thomas J. Schab

(57) ABSTRACT

A marker device for use by a votary in marking his position on a prayer strand includes a pair of identical body halves that are respectively provided with identical semi-circular grooves formed on inside surfaces of each body half. When the body halves are joined together, the semi-circular grooves are in registry so as to collectively form a throughbore that is centrally located on the body of the marker. The throughbore extends completely through the body of the marker in a position that is transverse to the body. The halves are held together by a pair of identical O-rings or a pair of identical miniature rubber bands. The outer surface of the body of the marker is further provided with a pair of identical channels for seating the O-rings therein. The diameter of the central throughbore is sized to match that of the outside diameter of a prayer strand bead.

10 Claims, 2 Drawing Sheets

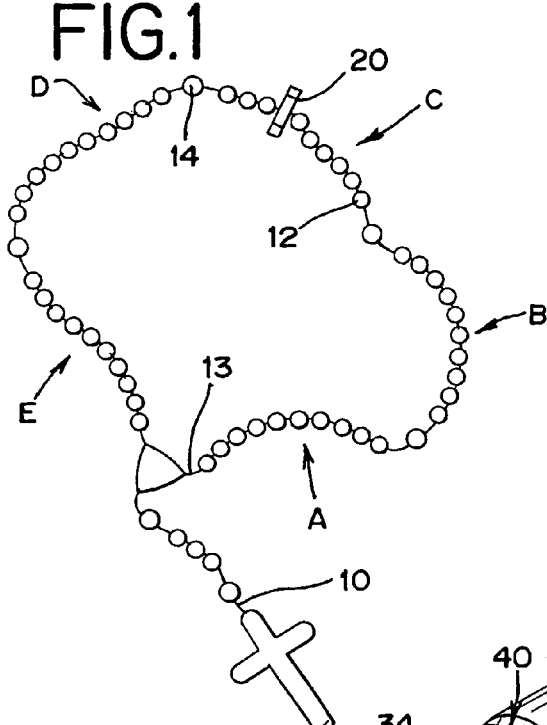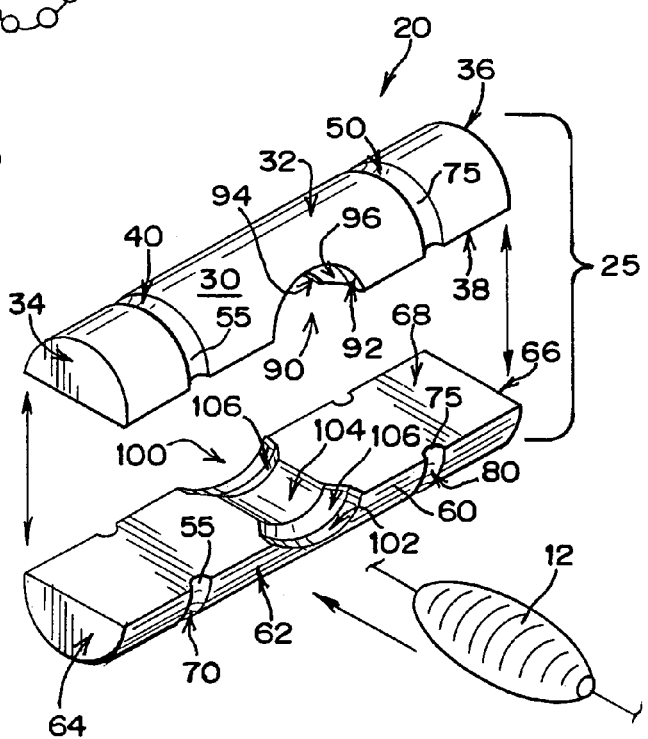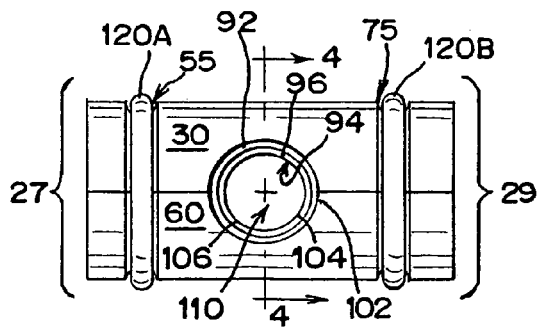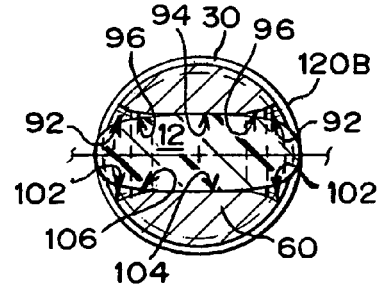

PRAYER STRAND MARKER DEVICE

BACKGROUND OF THE INVENTION

1. Field of the Invention

The present invention relates to a detachable marker device adapted to engage a prayer strand that is used for counting a sequence of prayers, wherein the strand has a plurality of nodes positioned on a cord or chain, each node representing a prayer to be prayed. More specifically, the present invention relates to an improved device for use with a prayer strand for marking and maintaining a user's position thereupon.

2. Discussion of the Prior Art

The use of prayer strands for assisting a votary to track the prayers he has been reciting during his prayer devotion has been well-known in many religions, especially with the Catholic and Muslim religions. Although the configuration of the prayer strands may differ between religions, all such prayer strands have a common construction comprising a resilient cord or ornamental chain that is provided with a series of spaced nodules or nodes. The nodes are most often in the form of plastic or wooden beads that are attached to the cord and the number of nodes on the prayer strand represents a specific number of prayers to be contemplated.

In the Catholic religion, the prayer strand is called a rosary, and it represents a series of repetitious prayers that are recited during meditation upon particular mysteries of the Life of Jesus Christ and with devotion to the Blessed Virgin Mary, who acts as an intercessory on behalf of the votary. The rosary in its basic sense comprises five groups of ten beads, each group being separated by a stand-alone bead. The ten beads, referred to as a decade, represent ten repetitions of the Hail Mary prayer while the stand alone bead represents the Our Father prayer. During recitation of each series of prayers within a particular group, the votary meditates upon specific events that the Catholic church has specified as best depicting the Joyful, Luminous, Sorrowful, and Glorious mysteries of the life of Jesus, known as the Mysteries of Redemption. Recitation of a full rosary represents recitation and mediation of the five groups of prayers under each of the four groups of mysteries. During the recitation of each prayer, it is common for the votary to continuously pinch and roll the particular bead between his index finger and thumb, moving from bead to bead along the rosary. As one might appreciate, there are a large number of prayers being recited during the course of a votary praying the rosary. Therefore, it is desirable to diligently keep track of any particular prayer that is being contemplated within one of the five groups of prayers. Also, one may intentionally pray only a certain number of decades at a time due to personal time constraints.

Various apparatuses and devices have been devised to personally assist a votary in keeping track of the prayers being recited because many times, he is interrupted during his devotional exercise. After the interruption, it is desirable to return to the exact prayer location on the rosary so that when prayer is resumed, the votary will not have to prolong his devotion by starting over or repeating prayers. One device is the rosary prayer marker presented by Frederick Belfied in U.S. Pat. No. 2,937,459. That device comprises a hollow one-piece body of a generally cylindrical configuration. The body is provided with a longitudinal slit that extends from one end of the body to the other. A user of the device forces the cord through the slit, thereby slipping the marker on the rosary strand. A series of flexible webs are positioned within the interior of the hollow body, each web extending radially inward. Each web has a curved end and the collective formation of the curved ends forms a circle for the rosary bead to be pulled through. A user advances the marker from bead-to-bead as the series of prayers are being recited, thereby helping the votary track his progress of devotion. However, it has been discovered that this particular device has shortfalls that limit its use. For example, the slit provided in the wall of the marker body has been found unacceptable for use with rosaries that substitute a decorative chain for the strand cord, as the slit will not accommodate chain. If the slit is made larger to accommodate chains, the marker has a tendency to fall off rosaries made with cording. Another shortfall of this device is that in order for the marker to remain attached to a rosary bead, the user must position the marker in a way that the rosary bead remains in simultaneous and continuous contact with each of the flexible webs. Because of the flexible nature of each web, it is almost impossible to position a rosary bead such that it is frictionally maintained in place in a simultaneous fashion within each of the webs. If a bead is not positioned correctly as described, the marker has a tendency to fall off the bead, defeating the purpose of the marker. A further disadvantage of this device is that over time and use, the integrity of each web disintegrates, causing acceleration of the above-mentioned problem.

Another rosary marker device was presented in U.S. Pat. No. 6,179,621 to Vaccari. This device uses a decorative alligator clip to mark the rosary bead the votary is contemplating. This device has a greater propensity to stay in place on the bead when compared to the Belfied marker, but it too has several shortcomings that make its use unacceptable. For instance, the teeth of the alligator clip are very sharp, causing them to damage the beads of the rosary. Furthermore, moving the clip from bead-to-bead becomes very cumbersome and time consuming, thereby becoming a detraction to the user's prayer devotion. The cumbersome nature of this marker device becomes even more evident when used by older people who have arthritis in their fingers or hands and who find squeezing of the clip arms together for movement to be extremely overburdening. Therefore, there is still a long felt need to provide a mechanical rosary marker device that is adaptable to various types of rosaries, is simple to advance and which easily captures and holds the beads of the rosary.

SUMMARY OF THE INVENTION

It is a principal object of the present invention to provide a rosary marker device for marking a position on a prayer strand having a plurality of beads positioned on a cord. That object is met by providing a marker device that is comprised of a pair of identical body halves that are held together by a removable retention means to form a body, whereby the body may be configured to have a number of differing geometrical shapes. The body is provided with a transversely extending throughbore of a predetermined diameter to frictionally receive, hold, and pass a rosary bead. The marker device also facilitates easy advancement to the next bead.

In another aspect of the invention, each body half is provided with an identical semi-circular groove formed therein, wherein said semi-circular grooves are in registry when said body halves are held together so as to define said throughbore having an entry and exit way portion and a bead holding portion. The entry and exit way portions are defined by surfaces that form identical diameters on that portion of the throughbore when the body halves are joined. The bead holding portions are defined by surfaces that form a diameter on that portion of the throughbore which is relatively smaller than the diameter of the entry and exit ways.

In another aspect of the invention, the marker device further includes at least one channel portion formed in an outer surface of each body half, the at least one channel portion of one body half in registry with the at least one channel portion of the other body half to form a continuous channel about the marker when the two body halves are held together. A retention means is seated in within the at least one channel and the retention means is comprised of at least one of an O-ring and a rubber band. When the body halves are held together by the retention means, the marker body has a configuration of one of a cylinder, a rectangle, a square and a spherical ball. If the body is configured as a spherical ball, the respective outer surface on each body half is provided with a single channel portion and when the two body halves are joined together, the channel portions are in registry with each other such that a single channel is continuously formed about the spherical marker body.

In another embodiment of the invention, the body is formed of a solid body in one of the same geometrical configurations listed above. The solid body is provided with a transversely disposed throughbore and a slit. The slit is disposed at a right angle to the throughbore and it extends between the throughbore and one of the ends of the body of the marker.

The features and advantages of the invention will be further understood upon consideration of the following detailed description of an embodiment of the invention taken in conjunction with the drawings, in which:

BRIEF DESCRIPTION OF THE DRAWINGS

FIG. 1 is a diagrammatic representation of a rosary only a portion shown in solid lines with the marker of the invention attached thereto;

FIG. 2 is a an exploded view of the marker of the invention detached from the rosary and showing the orientation of how the rosary bead enters or leaves the marker. This view does not include the retention means that holds the marker body halves together;

FIG. 3 is a frontal view of the marker with the retention means in place;

FIG. 4 is a an end elevation view looking in the direction of line 4-4 on FIG. 3 with one rosary bead being held within the marker;

DETAILED DESCRIPTION OF A PREFERRED EMBODIMENT

Figure 5:
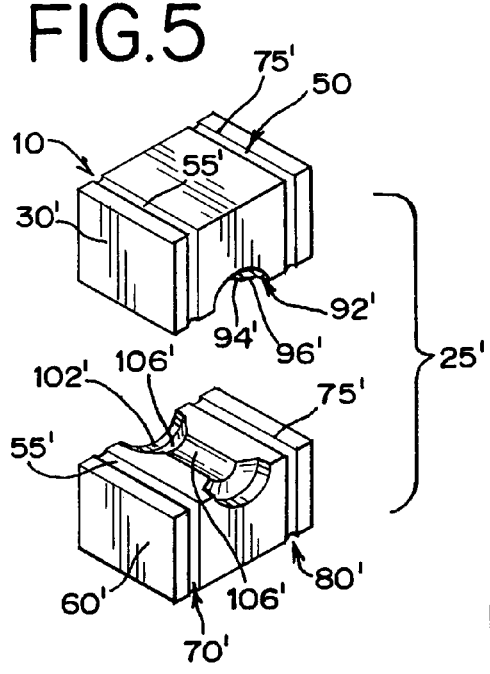
FIG. 5 is an exploded view of a second embodiment of the marker of the invention. This view does not include the retention means that holds the marker body halves together.

Reference is now made to FIGS. 1-4, where like parts are referred to by like numerals throughout. As shown in FIG. 1, the present invention is shown to comprise a marker 20 attached to a prayer strand 10. In this illustration, the particular type of prayer strand is known by those of the Catholic religion as a rosary. A rosary is also used by Catholics to say a another prayer devotion known as the Divine Mercy Chaplet. The rosary forms no part of the invention as its use represents a devotional exercise by the votary. All rosaries are constructed in the same manner where the essential components are a cross followed by four beads representing known introductory prayers, five groups (A-E) of ten prayer beads 12 representing the Hail Mary prayer, a single bead 14 in between each of the groups, the single bead representing the Our Father prayer. Saying the rosary is rather time consuming due to the number of repetitious prayers being recited, therefore it is not uncommon for a person engaged in such prayer devotion to find himself frequently interrupted so as to lose his location on the rosary or to be so self-absorbed in his prayers so as to forget to pass from one bead to the next. Moreover, many of the devotees of the rosary are senior citizens who may have physical handicaps like arthritis of the fingers or hands such that holding and squeezing a particular bead during prayers becomes a very difficult task. Because of that difficulty, many older votaries often lose their place along the prayer strand. The marker 20 of the present invention functions to assist any age votary in tracking the number of prayers already recited by clearly and easily marking an exact location on his prayer strand. Furthermore, in the preferred embodiments of the invention, the marker body is disposed in a position which is transverse to the line of beads on the prayer strand, which provides a means to assist the physically handicapped in passing the marker from one bead to the other. This feature is best exemplified in FIGS. 2 and 4 and in FIG. 6, where it is seen that a bead enters the side of the marker body, transverse to the longitudinal extent of the marker body. In those embodiments, it has been discovered that this arrangement facilitates advancement because the votary advantageously has a large surface area on the marker body to push against with his finger and thumb when advancing the marker. For instance, the user contacts the edge of his thumb and index finger against the outer surface of the body 25 at or adjacent to the area of the O-rings, while simultaneously pushing the marker body 25 towards the next bead. Thus, it should be appreciated that the large the surface area an impaired person has available to push against, the easier it is for him to advance the marker.

The prayer strand marker 20 of the preferred embodiment of the present invention is shown in FIGS. 2 and 3 to have a generally solid, cylindrically shaped body 25 that is formed by a pair of identical body halves 30,60. Each body half 30,60 is defined by a respective and corresponding outer surface 32,62, a first end surface 34,64, and an opposed second end surface 36,66. Each body half 30,60 is held together by a retention means 120 (See FIG. 3) that preferably comprises at least two identical O-rings 120A, 120B that are laterally spaced from each other. Each retention means 120A, 120B is seated within a respective complementary channel that is formed in the marker body 25. As FIG. 2 best shows, body half 30 is provided with a first channel portion 40 and a second channel portion 50 formed in the outer surface 32. The body half 60 is likewise provided with a first channel portion 70 and a second channel portion 80 formed in the outer surface 62. The respective first and second channel portions, 40,70 and 50,80 are in registry to the other when both body halves 30,60 are joined together, thereby forming continuous first and second channels 55 and 75 in the body 25 (See FIG. 3). The first and second channels 55,75 are identical to the other with the first channel being disposed between the first end 27 and the centrally disposed throughbore 110, and the second channel being disposed between the second end 29 and the centrally disposed throughbore 110. It is preferred that the channels 55,75, be disposed at exacting locations between the respective ends and the central throughbore. The channels 55,75 are provided so as to prevent the O-rings which comprise the retention means 120 from slipping off the marker body 25. The retention means 120 asserts a compressive force against the respective outside surfaces 32,62, of each body half 30,60, thereby holding them together while simultaneously compressing them against a rosary bead 12 or 14 held within the marker. Instead of providing O-rings, the retention means 120 may also be comprised of a pair of identical miniature rubber bands, which are well-known and therefore not shown. When rubber bands are utilized, the annular channels 55,75 may or may not be provided since rubber bands have less tendency to readily roll off the body 25.

The throughbore 110 is centrally located at the midpoint of the longitudinal extent of the marker body 25, which is defined as the distance between the respective first ends 34,64 and the respective second ends 36,66. The throughbore 110 transversely extends through body 25. As best seen in FIG. 2, it is seen that throughbore 110 is collectively formed by the combination of the identical, semi-circular grooves 90 and 100 formed into the respective interior surfaces 38,68, on each body half 30,60. When the two body halves 30,60 are assembled together, the semi-circular grooves 90,100, are in registry to each other, thereby defining the throughbore 110. The throughbore 110 is not of a continuous diameter through body 25, as the body has an entrance and exit area of the throughbore and a bead holding portion of the throughbore. The diameters of entry and exit portions of the throughbore are of a slightly larger than the bead holding portion of the throughbore and they have identical diameters. This point is best understood when viewing FIGS. 2 and 4, where it is seen that surfaces 92 and 102 define corresponding surface areas on respective semi-circular grooves 90,100 which form the larger diameter portion of the throughbore, while surfaces 94,104 form the smaller, yet constant, diameter portion of the throughbore. The surfaces 96,106 represent respective tapering surfaces, whereby the larger diameter at the entrance and exit ways tapers into the constant diameter within the body of the marker. As best understood when viewing FIG. 2, when a rosary bead 12 or 14 is to be received within the central throughbore 110, the bead is positioned transversely disposed with respect to the body 25 of the marker 20. The bead 12 will first encounter surfaces 92,102, which are of a larger diameter relative to the remaining diameter of throughbore 110. The larger entrance and exit diameters respectfully facilitates entry and passing of bead 12 within body 25.

Many rosary beads being manufactured today are somewhat oval shaped and they have an outside diameter at their widest point of about 5 millimeters. In the preferred embodiment of the invention, the central throughbore 110 will also have a diameter slightly less than 5 millimeters so that there is no tolerance between the bead outside surface and the surfaces 94 and 104, thereby preventing the marker 20 from slipping off the bead. Of course, it should be understood that the entrance and exit way surfaces 92,102, as explained above, are of a larger diameter to facilitate entry and exit of the bead from body 25. It is preferred that the diameter of the throughbore 110 in the entrance and exit ways be at least 6 millimeters and no more than 8 millimeters. If the outside diameter of the beads on a rosary or other type of prayer strand are larger than that stated above, then the diameter of the throughbore bead holding area can be sized accordingly such that no tolerance remains between the bead outside surface and the surfaces 94,104. Likewise, the diameter of the througbore at the entry and exit portions would be accordingly sized to cooperate with the diameter chosen for the bead holding area. In FIG. 4, it is seen that a rosary bead 12 is being held by the marker 20 of the invention. It is important to note that there is no tolerance provided between the rosary bead and the marker such that surfaces 94 and 104 remain in continuous contact against the bead. In the event that the outside diameter of the rosary bead is slightly larger than 5 millimeters due to manufacturing tolerance fluctuations, it has been found that some rosary beads can still be adequately received and accommodated by the marker of the invention without getting stuck within the throughbore 110. In those situations, it has been found that a larger diameter can still be advanced through the marker body although not as easily, as a larger bead will still cause a slight separation of the two body halves 30,60, while it advances through body 25. Despite the slight separation, each body half 30,60 is substantially held together by the retention means 120.

In use, the marker device 20 of the present invention is preferably attached to a prayer strand or a rosary by clamping each of the two body halves 30,60 around the cord of the prayer, although the two halves can be initially clamped around a bead 12 such that the bead is held within the respective semi-circular grooves 90,100. The retention means 120A and 120B are then slipped about the outer surface (collectively surfaces 32 and 62) of the body 25 and then rolled into place within the respective continuous channels 55,75, thereby holding the two body halves together for use. Once it is attached, the marker remains attached and then slipped back to the starting position although it can be disassembled after each rosary. To facilitate a votary in remembering which direction he was working along on his prayer strand, the starting portion 13 (See FIG. 1) on the cord of the prayer strand can be marked with a distinguishing color (black) from that of the natural color of the cord. In that way, if a votary has advanced his marker device 20 to the position shown in FIG. 1 and is then interrupted from praying, he can return to the prayer strand knowing that he was moving along it in a direction away from the marked portion 13. The votary has the choice of allowing the marker device body to rest on the bead being comtemplated or to advance it past that such that it centered between the comtemplated bead and the next bead.

Figure 6:
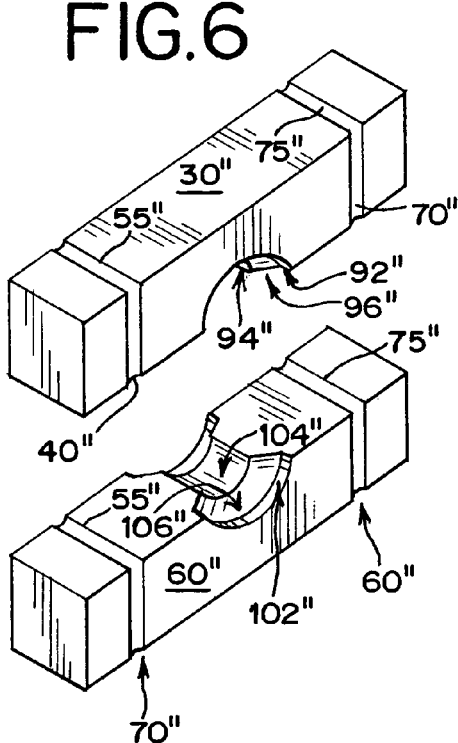
FIG. 6 is an exploded view of a third embodiment of the marker of the invention. This view does not include the retention means that holds the marker body halves together.
Figure 7:
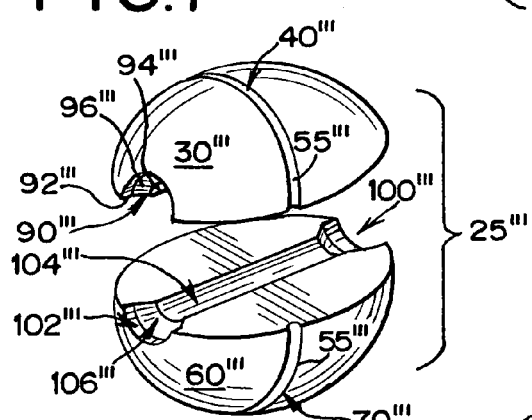
FIG. 7 is an exploded view of a fourth embodiment of the marker of the invention. This view does not include the retention means that holds the marker body halves together.

The present invention is not limited to only the cylindrical embodiment shown in FIGS. 1-4, rather it is possible to maintain the advantages of the invention even if the body of the marker is configured as a square, a rectangular or a sphere. For example, in FIG. 5, it is seen that a second embodiment of the body 25' of the marker has a square configuration, again being formed by a pair of identical body halves 30',60'. Each body half is provided with respective first and second channel portions 40',70' and 50',80', which are in registry to each other and which form a pair of laterally spaced, identical continuous channels 55',75' in each body half. The channels 55',75', encompass the entire body 25' and receive therein the retention means 120', which comprise a pair of identical O-rings 120A',120B'or rubber bands (not shown). A throughbore 110' is located in the exact center of the square and is formed by the identical first and second grooves 90,100 formed in each body half. The throughbore 110' is sized as so as to function exactly as explained above with the preferred embodiment with respect to receiving, holding and passing a rosary bead. In FIG. 6, a third embodiment of the body 25" is seen to be configured as a rectangle and it is formed by a pair of identical body halves 30" and 60". Each body half is provided with respective first and second channel portions 40",70" and 50", 80". which are in registry to each other and which form a pair of laterally spaced, identical continuous channels 55",75" in each body half, as well as the identical first and second grooves 90" and 100" which define the throughbore 110". The channels 55",75". encompass the entire body 25" and receive therein the retention means 120". which comprise a pair of identical O-rings 120A",120B" or rubber bands (not shown). A throughbore 110" is located in the exact center of the square and is sized as mentioned above so as to function exactly the same as all previous embodiments with respect to receiving, holding and passing a rosary bead. In FIG. 7, a fourth embodiment of the marker body 25'''invention is seen to be configured as a spherical ball that is formed by a pair of identical body halves 30''' and 60''', each being provided with only a single channel portion 40''' and 70''' formed in each body half so that only one continuous channel 55'''encompasses the entire body and receives therein the retention means 120''' which comprises a single O-ring 120'''or a rubber band (not shown). A throughbore 110''' is located so to traverse through the exact center of the body 25'''. Throughbore 110''' is formed by the identical grooves 90''' and 100''' in each body half and is again sized as previously mentioned to allow this embodiment to function as explained with the preferred embodiment.

Figure 8:
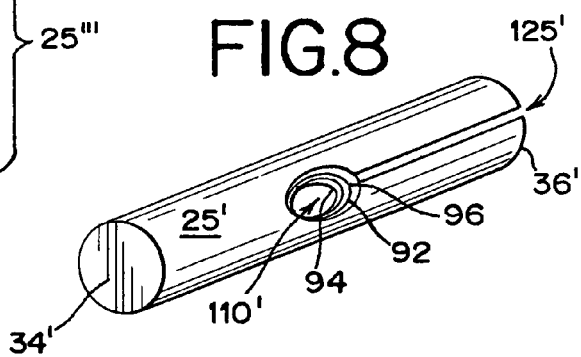
FIG. 8 is a perspective view of a second embodiment of the invention.

In yet another embodiment of the invention shown in FIG. 8, the marker device 20' has a solid, one piece body 25' and the body may take on any of the geometrical configurations that were presented with the two piece bodies shown in FIGS. 2 and 5-7. Therefore, it should be understood that the following description of the features of this embodiment also apply to the same embodiment even when it is configured as a rectangle, a square or a sphere. Body 25' has opposed first and second ends 34' and 36' and a throughbore 110'extending through said body transverse to said first and second ends. The body 25' is also provided with a slit 125'extending through said body between the throughbore 110' and either of said first and second ends 34' or 36.' The throughbore 110' and slit 125' are disposed at 90 degree angles to the other. The throughbore. 110' has a diameter of a predetermined size to frictionally receive, hold, and pass a bead therethrough. The throughbore diameter is substantially 5 millimeters, and may be at times about a half a millimeter larger, depending upon manufacturing tolerances. The desire is to kept the diameter as close to the outside bead diameter as possible, otherwise, the marker of this embodiment will easily slide from bead to bead, thereby defeating the purpose of the device. The slit 125' has a width of a predetermined extent to frictionally receive and retain said cord thereon. The entry and exit ways of the throughbore may be provided with counterboring so that the hole diameter of these areas is larger than the bead holding portion, as explained above in the first embodiment of the invention. In this way, the throughbore at the immediate entry and exit ways has a slightly larger diameter compared to the portions therebetween which hold the bead. The larger diameters facilitate entry and passing of a bead from within the body. To use this embodiment, the cord is inserted within slit 125' and pushed into the body 25' until it reaches throughbore 110'. The device is then ready for use in the exact manner as described above.

With the various embodiments according to the present invention, a votary is provided with a marker device that allows him to keep exact track of which rosary or prayer strand bead he was contemplating should he stop praying for whatever reason and which facilitates a physically impaired user to easily advance the marker to the next bead along the prayer strand. While the several apparatuses herein disclosed form a preferred embodiment of this invention, it will be understood that this invention is not so limited, and changes can be made without departing from the scope and spirit of this invention, which is defined in the appended claims.

I claim:

1. A device for marking a position on a prayer strand having a plurality of beads positioned on a cord, comprising:
    a body having a pair of identical body halves; and
    removable retention means for holding said body halves together, wherein said body has a throughbore transversely extending therethrough, said throughbore of a predetermined diameter to frictionally receive, hold, and pass a rosary bead therethrough.

2. The marker device of claim 1, wherein each said body half has an identical semi-circular groove formed therein.

3. The marker device of claim 2, wherein said semi-circular grooves are in registry when said body halves are held together so as to define said throughbore.

4. The marker device of claim 1, wherein said retention means is comprised of at least one of an O-ring and a rubber band.

5. The marker device of claim 4, further including at least one channel formed in an outer surface of each said body half, said at least one channel of one body half in registry with said at least one channel of the other body half when said body halves are held together.

6. The marker device of claim 5, wherein said retention means is seated in within said at least one channel.

7. The marker device of claim 6, wherein when said body halves are held together, said body has a configuration of one of a cylinder, a rectangle, a square and a spherical ball.

8. The marker device of claim 7, wherein when said body has a configuration as a spherical ball, said respective outer surface on each body half is provided with a single channel, said single channel on one body half in registry with the single channel on the other body half when said body halves are held together.

9. The marker of claim 8, wherein the retention means is seated within said single channel.

10. A device for marking a position on a prayer strand having a plurality of beads positioned on a cord, comprising:
    a solid body having an opposed first and second ends wherein said body includes a throughbore extending through said body transverse to said first and second ends and a slit extending through said body between one of said first and second ends and said throughbore, said throughbore and slit disposed at 90 degree angles to the other, said throughbore having a diameter of a predetermined size to frictionally receive, hold, and pass a bead therethrough, said slit having a width of a predetermined extent to frictionally receive and retain said cord thereon.

* * * * *